United States Patent
Miller et al.

(10) Patent No.: US 11,361,357 B2
(45) Date of Patent: Jun. 14, 2022

(54) METHOD, SYSTEM, AND COMPUTER PROGRAM PRODUCT FOR DATA ATTRIBUTION OF ITEMS AND CONTEXTUAL CONTENT CREATION OF COORDINATING GROUPS FOR THE ITEMS

(71) Applicant: Stylyze Inc., Seattle, WA (US)

(72) Inventors: Kristen A. Miller, Sammamish, WA (US); Lisa M. Perrone, Vancouver, WA (US); Sophie M. Huang, Newcastle, WA (US)

(73) Assignee: THE NEIMAN MARCUS GROUP LLC, Dallas, TX (US)

( * ) Notice: Subject to any disclaimer, the term of this patent is extended or adjusted under 35 U.S.C. 154(b) by 116 days.

(21) Appl. No.: 15/815,943

(22) Filed: Nov. 17, 2017

(65) Prior Publication Data

US 2018/0144387 A1 May 24, 2018

Related U.S. Application Data

(60) Provisional application No. 62/424,044, filed on Nov. 18, 2016.

(51) Int. Cl.
*G06Q 30/00* (2012.01)
*G06Q 30/06* (2012.01)

(52) U.S. Cl.
CPC ..... *G06Q 30/0627* (2013.01); *G06Q 30/0603* (2013.01); *G06Q 30/0629* (2013.01); *G06Q 30/0643* (2013.01)

(58) Field of Classification Search
None
See application file for complete search history.

(56) References Cited

U.S. PATENT DOCUMENTS

2011/0085697 A1* 4/2011 Clippard ............. G06K 9/6212
382/100
2013/0151481 A1 6/2013 Andrasick et al.
(Continued)

OTHER PUBLICATIONS

Albadvi, Amir, A Hybrid Recommendation Technique Based on Product Category Attributes, Nov. 2009, Expert Systems with Applications, vol. 36, pp. 11480-11488 (Year: 2009).*

(Continued)

*Primary Examiner* — Jeffrey A. Smith
*Assistant Examiner* — Timothy J Kang
(74) *Attorney, Agent, or Firm* — Cantor Colburn LLP

(57) ABSTRACT

A method includes receiving data in an electronic format that describes an item, and assigning a unique identifier to the item. The data is normalized across one or more data sets of data that describe other items. The normalizing includes deriving functional and aesthetic attributes of the item based at least in part on the data that describes the item, where at least one of the derived attributes is not included in the data. The normalizing also includes programmatically mapping the attributes to a defined set of taxonomies for pre-defined attribute types. At least one other item is located in the one or more data sets having attributes that coordinate with the attributes of the item. A user interface that includes a styleboard with an image of the item and an image of the at least one other item having attributes that coordinate with attributes of the item.

20 Claims, 12 Drawing Sheets

(56) References Cited

U.S. PATENT DOCUMENTS

| | | | | |
|---|---|---|---|---|
| 2014/0304265 A1* | 10/2014 | Topakas | .............. | G06F 3/04815 |
| | | | | 707/737 |
| 2015/0235389 A1* | 8/2015 | Miller | ................ | G06Q 30/0643 |
| | | | | 345/594 |
| 2016/0055448 A1* | 2/2016 | Ellis | ..................... | G06Q 10/087 |
| | | | | 705/28 |
| 2018/0130114 A1* | 5/2018 | Hawkins | ................ | G06Q 50/01 |

OTHER PUBLICATIONS

Internation Search Report / Written Opinion, International Application No. PCT/US17/62212; Internaltional Filing Date: Nov. 17, 2017; dated Feb. 2, 2018, 16 pages.

International Preliminary Report on Patentability / Written Opinion, International Application No. PCT/US17/62212; Internaltional Filing Date: Nov. 17, 2017; dated Aug. 1, 2019, 10 pages.

* cited by examiner

METHOD, SYSTEM, AND COMPUTER PROGRAM PRODUCT FOR DATA ATTRIBUTION OF ITEMS AND CONTEXTUAL CONTENT CREATION OF COORDINATING GROUPS FOR THE ITEMS

CROSS-REFERENCE TO RELATED APPLICATION

This application claims the benefit of U.S. Provisional Application No. 62/424,044, filed Nov. 18, 2016, and entitled "DATA ATTRIBUTION OF ITEMS AND CONTEXTUAL CONTENT CREATION OF COORDINATING GROUPS FOR THE ITEMS", the content of which is incorporated herein by reference in its entirety

BACKGROUND

The present invention relates to programmatic data attribution of datasets and programmatic contextual content creation of coordinating item groupings, and more specifically, to programmatic data attribution of items and content creation processes of coordinating groups of items from a single compartmentalized dataset and/or multiple datasets associated with various independent data sources.

Color and style have a significant impact on our life experience. Whether shopping for clothing or redecorating a home, finding and coordinating products that look good together from an aesthetic perspective is challenging, and many people do not have the time or money to hire a designer or stylist to aid with these decisions.

More and more recently, there has been an explosion of online retailers each offering a set of products through web-based catalogs. In addition to products available in-store, the magnitude of product inventory available online makes these buying decisions even more overwhelming. Selecting products based on color and style preferences, or context such as room for home décor and occasion for apparel, can be challenging, particularly when the customer seeks to coordinate aesthetic attributes of various items within and across independent and compartmentalized catalog sources (e.g., multiple independent online retailers and catalogs).

SUMMARY

Embodiments of the present invention include methods, systems, and computer program products for providing data attribution of items and contextual creation of coordinating groups for the items. A non-limiting example method includes receiving data in an electronic format that describes an item, and assigning a unique identifier to the item. The data is normalized across one or more data sets of data that describe other items. The normalizing includes programmatically deriving functional and aesthetic attributes of the item based at least in part on the data that describes the item, where at least one of the derived attributes is not included in the data. The normalizing also includes programmatically mapping the attributes to a defined set of taxonomies for pre-defined attribute types. At least one other item is located in the one or more data sets having attributes that coordinate with the attributes of the item. The locating includes, for each of the pre-defined attribute types, comparing attributes of the item mapped to a pre-defined attribute type with attributes of the at least one other item mapped to the pre-defined attribute type. A user interface that includes a styleboard is generated. The styleboard includes an image of the item and an image of the at least one other item having attributes that coordinate with attributes of the item.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 4 depicts a user interface with manual editing capabilities for refining product attributes according to an embodiment of the present invention;

FIG. 5 depicts a user interface with manual editing capabilities for refining styleboard attributes according to an embodiment of the present invention;

FIG. 6 depicts a user interface for manually create a styleboard according to an embodiment of the present invention;

FIG. 7 depicts a user interface for editing a styleboard according to an embodiment of the present invention;

FIG. 8 depicts a user interface for displaying a styleboard to a customer in an on-line shopping application according to an embodiment of the present invention;

DETAILED DESCRIPTION

Exemplary embodiments of the present invention provide data attribution of items and contextual content creation of groupings of coordinating items that can be viewed, edited, purchased and shared via various media outlets, such as social media and email. The data attribution described herein programmatically extracts and normalizes item data across a single compartmentalized data set and/or across multiple compartmentalized data sets, such as product catalogs. The attributes may be surfaced in a user interface that enables a user to review and manually adjust attribution. These, and other, features of the data attribution and content creation processes will now be described.

It is also understood in advance that although this disclosure includes detailed examples of apparel items, that implementations recited herein are not limited to apparel. Rather, embodiments of the present invention are capable of being implemented for any type of items where coordination with other items is desirable, such as, but not limited to, home décor, office décor, retail business décor (store, hotel, restaurant, etc.), and outdoor décor.

As used herein, the term "programmatically" refers to processing that is performed by one or more computer instructions executing on a computer.

It is understood in advance that although this disclosure includes a description of a client/server-based architecture, implementation of the teachings recited herein are not limited to a client-server environment. Rather, embodiments of the present invention are capable of being implemented in conjunction with any other type of computing environment now known or later developed. For example, the embodiments described herein may be implemented using a cloud computing platform. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

Figure 1:
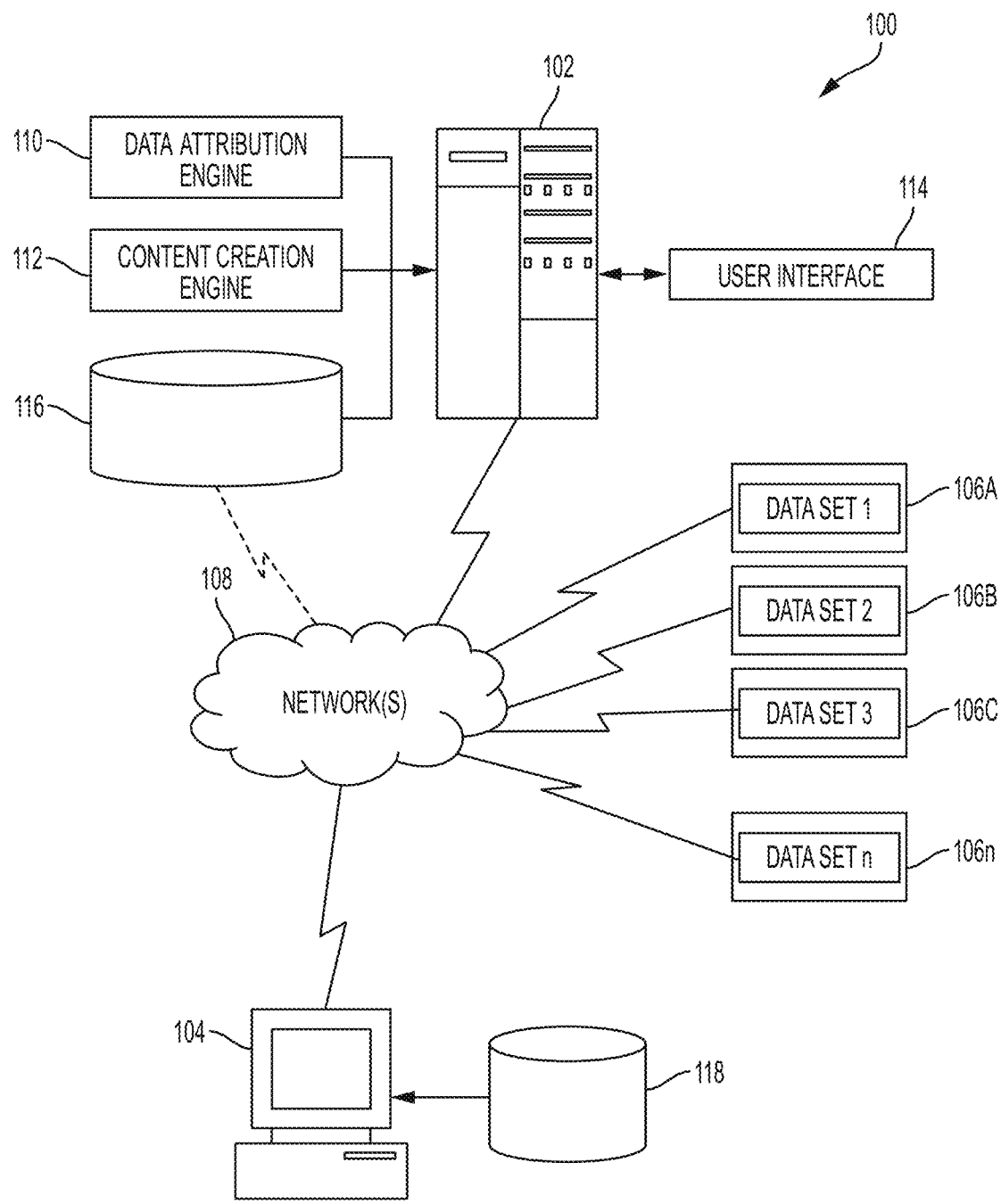
FIG. 1 depicts a system upon which data attribution and contextual content creation may be implemented in accordance with an embodiment of the present invention.

Turning now to FIG. 1, a system 100 upon which the data attribution and content creation processes may be implemented will now be described in an exemplary embodiment. The system 100 includes a host system computer 102, a user system 104, and data provider sources 106A-106n, each of which is communicatively coupled to one or more networks 108. The host system computer 102 may be implemented as a high-speed computer processing device for handling the volume of activities associated with users of the data attribution and content creation processes. In an embodiment, the host system computer 102 is operated by a service provider enterprise.

The user system 104 may be operated by an end user of the data attribution and content creation processes described herein. For example, the end user may be a customer having an interest in purchasing clothing items and/or accessories, or home décor. The end user could also be a store associate or customer service associate helping customers find and coordinate products both in-store and online. The end user browses the web in search of various items. The user system 104 may be implemented as a general-purpose computer (e.g., desktop or laptop). Alternatively, the user system 104 may be implemented as a mobile device, such as a smart phone, tablet, or personal digital assistant. While only one user system 104 is shown in FIG. 1 for ease of illustration, it will be understood that any number of user systems may be employed in order to realize the advantages of the exemplary embodiments. The user system 104 shown in FIG. 1 is communicatively coupled to storage device 118 for storing, for example, a copy of data particular to the user of the user system 104 such as user profiles, predefined content attribute types, attribute mapping among data structures, and styleboards. For example, the data stored in storage device 118 may correspond to a catalog and/or a retailer.

Data provider sources 106 each store one or more datasets corresponding to items sold by representative agents of the data provider sources 106. In an embodiment, each of the data provider sources 106 may represent a retail establishment server computer, which in turn, stores a dataset corresponding to items it sells. The dataset can take the form of an online catalog. The dataset can be a proprietary database accessible to customers via a website. The dataset can be in-store inventory accessed through a point-of-sale (POS) system. The dataset can be an online catalog accessible via data feed or application programming interface (API). In an embodiment, the data provider sources 106 may represent end users of the data attribution and content creation processes. For example, a user interface can be generated and embedded (e.g., as middleware) into the website catalog or mobile application for enabling the data attribution and content creation processes described herein. In this embodiment, the interface is personalized for the items sold by the retailer.

Figure 3:
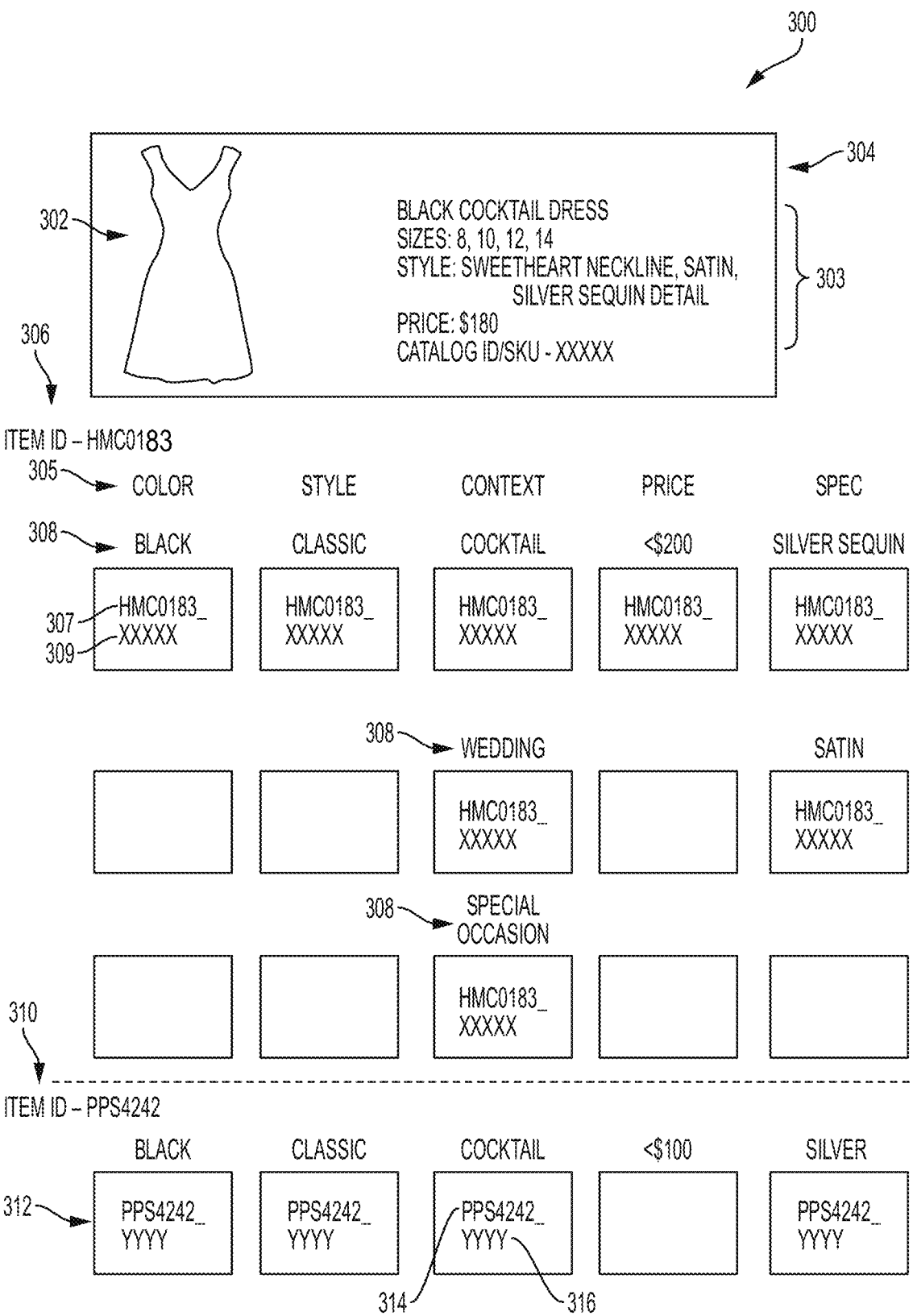
FIG. 3 depicts a sample catalog item and corresponding data structures generated by the data attribution and contextual content creation system according to an embodiment of the present invention.

The host system computer 102, as a service provider to one or both of the end user of user system 104 and/or the data provider sources' 106 representatives, implements an application to facilitate the data attribution and content creation processes. As shown in FIG. 1, the application includes an application data attribution engine 110 and a content creation engine 112. The data attribution engine 110 is configured to access the data provider sources' 106 servers or data feeds, extract data from items listed thereon, and normalize the data with respect to defined data structures. FIG. 3 illustrates a portion of this process. The content creation engine 112 is configured to programmatically create contextual groupings of products and images from the normalized data via the data structures. These features are described further herein.

The application generates a user interface 114 that provides information created by the data attribution engine 110 and content creation engine 112. Sample user interfaces are shown generally in FIGS. 4-12.

The system 100 of FIG. 1 also includes a storage device 116 communicatively coupled to the host system computer 102. The storage device 116 may be implemented using a variety of devices for storing electronic information. It is understood that the storage device 116 may be implemented using memory contained in the host system computer 102 or it may be a separate physical device, as illustrated in FIG. 1. The storage device 116 may be logically addressable as a consolidated data source across a distributed environment that includes the networks 108. Information stored in the storage device 116 may be retrieved and manipulated via the host system computer 102 and authorized users, such as the user system 104 and data provider sources 106. The storage device 116 houses user profiles, predefined content attribute types, and attribute mapping among data structures. The user profiles, in turn, may store individually created or shared item groupings, which are referred to herein as styleboards.

In an embodiment, the host system computer 102 operates as a database server and coordinates access to application data including data stored on storage device 116.

The networks 108 may be any type of known networks including, but not limited to, a wide area network (WAN), a local area network (LAN), a global network (e.g. Internet), and an intranet. The networks 108 may be implemented using wireless networking technologies or any kind of physical network implementation known in the art. User system 104 and data provider sources 106 may be coupled to the host system computer 102 through multiple networks (e.g., Internet, intranet, and private network) so that not all systems are coupled to the host system computer 102 through the same networks.

Figure 2:
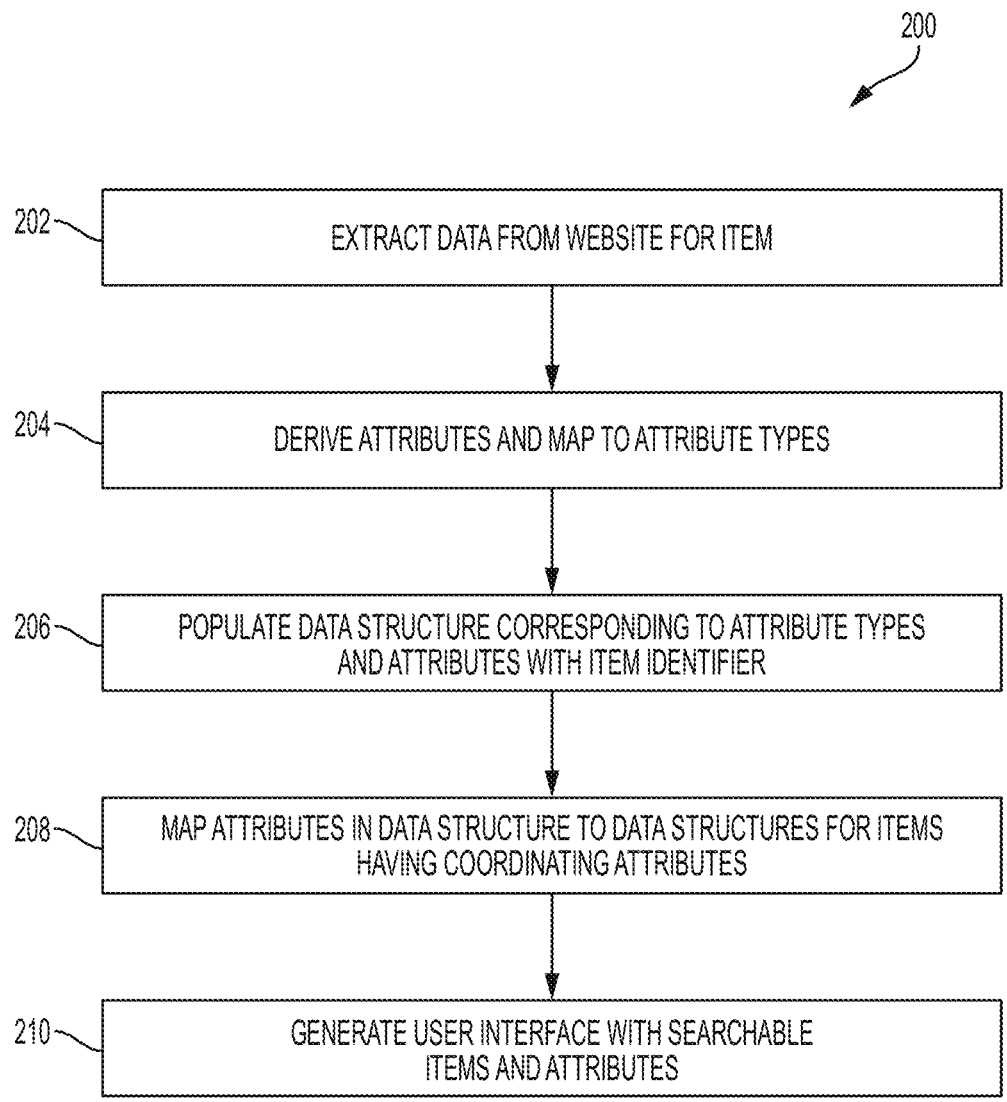
FIG. 2 depicts a flow diagram of a process for implementing a portion of the data attribution and contextual content creation according to an embodiment of the present invention.

Turning now to FIG. 2, a flow diagram describing a process for implementing the data attribution and content creation processes will now be described in accordance with an embodiment.

At step 202, the data attribution engine 110 extracts data from a website or data feed of a data provider source with respect to an item listed on the web site or available in store. As shown in FIG. 3, for example, a catalog item 304 is displayed on the website. The catalog item depicts an image 302 of the item 304, which is a dress. A description 303, or metadata, provides further details relating to the item. The item 304 is assigned a unique identifier 306 by the data attribution and content creation processes.

The data extraction process includes determining, or deriving, attributes of the item 304 based, for example, on the image 302 and/or the description 303. The deriving can be performed, for example, using image recognition techniques, machine learning and/or word analysis.

At step 204, the data attribution engine 210 derives the attributes that correspond to the extracted data and maps the attributes to predefined attribute types. In an embodiment, the attribute types include color, color group, style, product type, product context, finish, material, pattern, collection, brand, vendor, price ranking, and specifications. Color reflects the most relevant colors in the image and can be derived using a color palette, and corresponding color names and notations. Color group defines where the image fits in a predefined color space so that it can be coordinated with colors and images from the same color space. A color group can include a variety of colors that a designer, or some other entity, has deemed to coordinate with each other. Style is a cross type style notation that describes the overall aesthetic of the product such as chic, classic or mod for apparel, and rustic, modern or coastal for home decor. The style taxonomy can be created by cataloging a wide range of keywords such as patterns, materials, textures, brands designers and other descriptors that define the aesthetic of a product. These keywords are then mapped into a taxonomy and associated with specific style types. The data attribution engine 110 derives keywords, or attributes, from images and associated data, maps them to the style taxonomy, and uses algorithms to determine the appropriate style types for the item.

Product type is normalized across vendors and retail catalogs using a product type taxonomy that is granular enough to accurately describe a product. For example, the product type taxonomy may specify "off the shoulder midi dress" as the product type for a midi dress that is off the shoulder, or "kitchen island light" for hanging lights designed to go above a kitchen island. Product context defines either the room an item belongs in for home décor items, or the occasion an item would be worn for apparel. The product taxonomy defines a list of product types that are associated with each room or occasion. Once an item is assigned a product type, it is mapped to the context taxonomy and assigned its appropriate rooms or occasions. Specification data includes functional information such as installation data that ensures that items that are grouped together function well together. Specification data can be derived from the item image and associated data. Finish can be derived from the item image and data and is mapped to a color/finish taxonomy that includes metallic finishes such as bronze or brushed nickel, and color finishes such as matte black. Pattern can be derived from the item image and associated data and is mapped to a taxonomy that includes a wide range of patterns such as floral, herringbone and geometric. Material can be derived from the item image and associated data and includes attributes such as polyester and 100% cotton. Collection can be derived from a set of images and associated data where items from the same collection can be mapped together using image recognition and data-mining text for keyword patterns with collection names such as KOHLER® Devonshire® or Jonathan Adler™ Meurice.

As described above, attributes that are not included, or specified, in the data about the item (e.g., the metadata) can be derived based on the data or other sources. For example, color attributes can be derived based on an image in the data, and color group attributes can be derived based on the derived color attributes and previously defined color groups.

Figure 4:
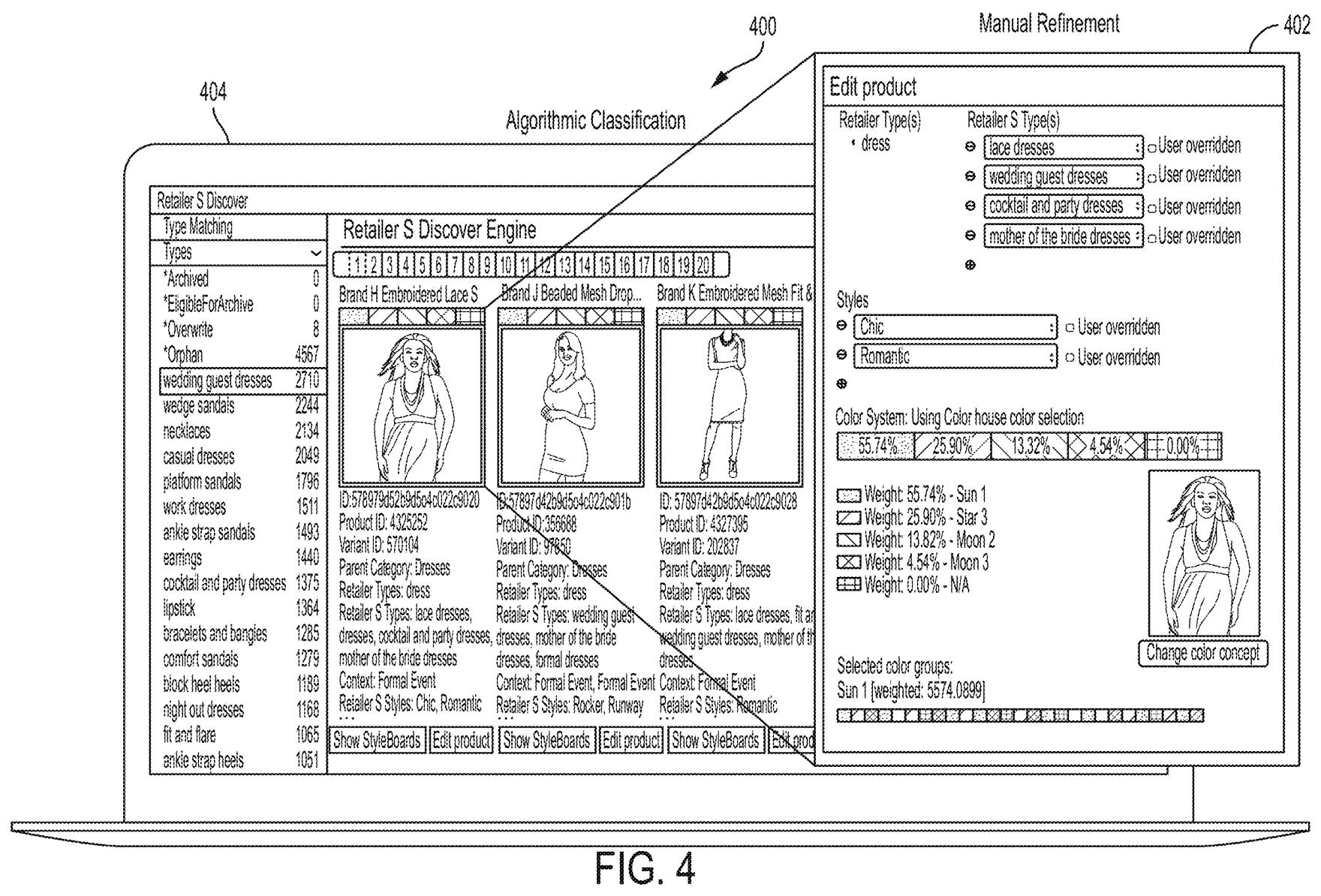

Users may have the ability to manually adjust attributes that are generated programmatically as shown in FIG. 4. As shown in FIG. 3, five attribute types 305 are shown as color, style, context, price, and specifications. Further, each identified attribute 308 is listed with its corresponding attribute type. In addition, a data structure may be generated for each attribute within an attribute type 305. For example, in FIG. 3, under the attribute type CONTEXT, a data structure is populated for attributes COCKTAIL, WEDDING, and SPECIAL OCCASION. After adding functional and aesthetic attributes to an item, the product attribution engine will map the item to other items containing the same product attributes to create a similar item feed.

The product type and associated image and metadata are used to select a subset of the attributes of the item that are most relevant to describe the item from an aesthetic and functional perspective. For example, if the product type is a 72 inch bathroom vanity with a top, the system will determine that the product belongs in the home décor vertical and should be processed for home décor styles and contexts. Additionally, the system will determine that the product has functional attributes such as scale and specification for which sinks and faucets will be compatible with the vanity top. The system will also process the image and metadata to determine if there are relevant color/finish, materials, patterns or collections to derive that are relevant to the aesthetic and functional attribution of the item.

At step 206, data structures corresponding to the attribute types associated with the identified attributes are populated with the unique identifier of the item. In FIG. 3, the unique identifier 306 "HMCO183" is populated in each representative data structure. If the data attribution and content creation processes is configured to distinguish among independent datasets from multiple retailers, the identifier 306 may be appended with an identifier or stock keeping unit (SKU) assigned to or associated with the retailer with respect to the item 304. As an example, the SKU for the item is shown in 303 as "XXXXX." The appended identifier is shown at 309.

At step 208, the content creation engine 112 maps the attributes in the data structures to data structures for items having coordinating attributes. As shown in FIG. 3 by way of illustration, data structures 312 for a second item 310, which represents shoes having identifier PPS4242, indicate coordinating attributes: black (color), classic (style), cocktail (context), and silver (finish). In addition to mapping coordinating attributes the content creation engine places the item in its appropriate context and coordinates it with other items to create a complete item grouping. For each context sequence, lists of appropriate items are generated to describe which specific product types go together to create each room or occasion. For example, if a product type "Sheath Dress" is the seed item and it has the color group "Star 1" (which may include several colors), the style type "Chic" and the context "Wedding Guest", the next items mapped together will also have the color group "Star 1", the style type "Chic" and the context "Wedding Guest". Additionally, they will map to a "Wedding Guest" sequence containing the product type "Sheath Dress" to ensure that products will not only look good together from a color and style perspective, they will also function well together and not contain duplicating product types.

In the example shown in FIG. 3, an appended identifier 316 of "YYYYY" to the identifier 314 indicates that the item 310 is from another retailer's website. Thus, the content creation engine 112 is configured to programmatically map the attributes from the data structures to similar and/or coordinating items either from the same dataset or across multiple datasets. The content creation engine 112 can also be configured to create styleboards that reflect specified products, trends, brands, occasions, styles, and colors. Styleboards can be rapidly created using the content creation engine 112. For example, five to one thousand styleboards can be created based on a single SKU and by automating the process of creating styleboards millions of styleboards can be created in a few hours. Additionally, each of the items in the styleboard is mapped to a similar product feed. This enables end users to manually edit the styleboard by selecting from a presented range of similar products and also enables the content creation engine to programmatically edit or adjust styleboards and products go out of stock or are discontinued.

Turning back to FIG. 2, at step 210, the content creation engine 112 generates a customized user interface with review, editing, and search capabilities for the end user. The embodiment described in FIGS. 2 and 3 reflects one example of how two products from two independent catalogs can be coordinated and is provided for ease of illustration. It will be understood by those skilled in the art that the processes described in FIGS. 2 and 3 can be extended to encompass identification and mapping of similar products, coordinating products, and entire coordinating looks.

Once the data attribution and contextual content creation processes are complete for a specific retail catalog or across retail catalogs, the data can be served to retailers or other partners via APIs (application programming interfaces) to improve their digital, mobile and in-store customer experiences. Data can also be served to retailers, other partners and/or customers through user interfaces such as styleboards, recommendation bands, mobile experiences, search engine results and stand-alone websites designed to help customers find and coordinate products based on colors and styles they love. Examples of these experiences are depicted in FIGS. 4-12 below.

Turning now to FIG. 4, a user interface 400 with manual attribute editing capabilities with respect to an item processed by a data attribution engine, such as data attribution engine 110 of FIG. 1, will now be described in accordance with an embodiment of the present invention. In an embodiment, the user interface 400 shown in FIG. 4 is generated and updated based on user input by content creation engine 112 and/or data attribution engine 110 of FIG. 1. In an embodiment, when a user manually adjusts data attributes, the change is associated with the unique product identifier of the item and stored, for example in storage device 116. A similar process occurs when data attributes are changed for any other reasons, such as, for example detecting a change in the data describing the item The user interface 400 illustrates a page from an administrator portal, accessed for example via user system 104, that a retailer can use to review and adjust the output of the programmatic data attribution engine 110. Once processed by the data attribution and content creation processes (such as those shown in FIG. 2), a user (e.g., a representative of the retailer) can view a window 404 showing the results of the algorithmic classification process, and attributes than can be modified through sub-window 402 shown to the right. Various identified attributes can be overridden by the user, such as style type, style, and color, as shown in FIG. 4. In this manner, the user can save time (when compared to identifying the attributes manually) by using a data attribution engine 110 to programmatically generate attributes for items, while still being able to make manual refinements to the results to enrich data attribution to provide a deeper level of personalization across digital and in-store experiences. This method can also be used to train machine learning implementations of the data attribution engine 110.

Figure 5:
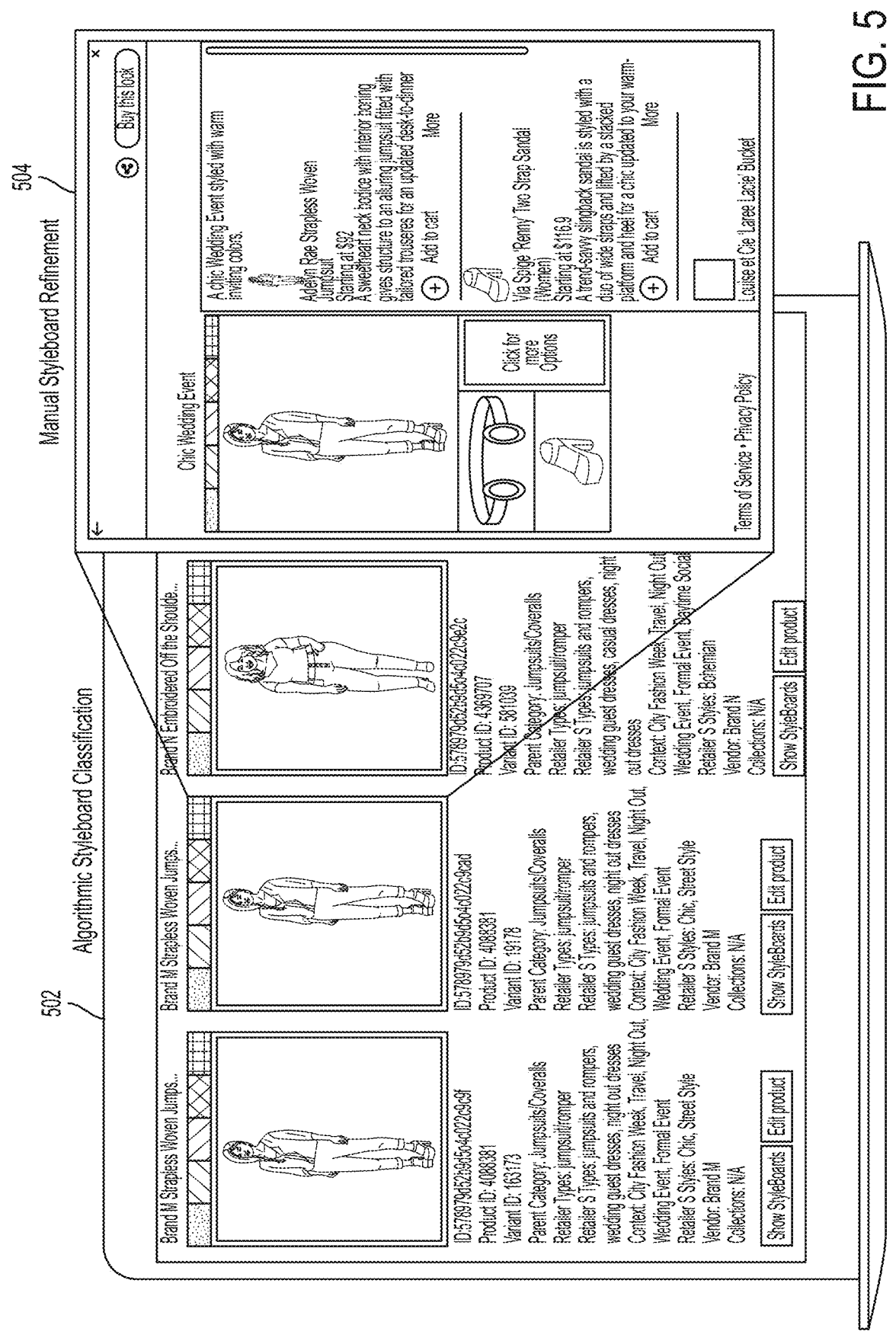

Turning now to FIG. 5, a user interface 500 with manual editing capabilities for refining styleboard attributes will now be described in accordance with an embodiment of the present invention. In an embodiment, the user interface 500 shown in FIG. 5 is generated programmatically and updated based on user input by content creation engine 112 and/or data attribution engine 110 of FIG. 1. In an embodiment, when a user manually edits a styleboard, a unique identifier is generated for the edited styleboard and the collection of products associated with the styleboard are stored, for example in storage device 116. A similar process occurs when a styleboard is changed for any other reasons, such as, for example detecting a change in the data describing an item in the styleboard.

As shown in the user interface 500 of FIG. 5, similar to the product catalog item, the user can refine a programmatically generated styleboard. The user can be a retailer merchandiser, customer, store associate, customer service agent or anyone else engaging with the content. Via user interface 500, the user can click on items on the styleboard 502 to view similar products (as shown in sub-window 504) and swap them out, add new items or images, delete items or images, and edit the title and description associated with the styleboard. By using a content creation engine 112 to programmatically generate styleboards, the user can spend less time manually creating styleboards, while still being able to make manual refinements to the results to specify things such as, but not limited to products, trends, brands, occasions, styles, and colors.

Figure 6:
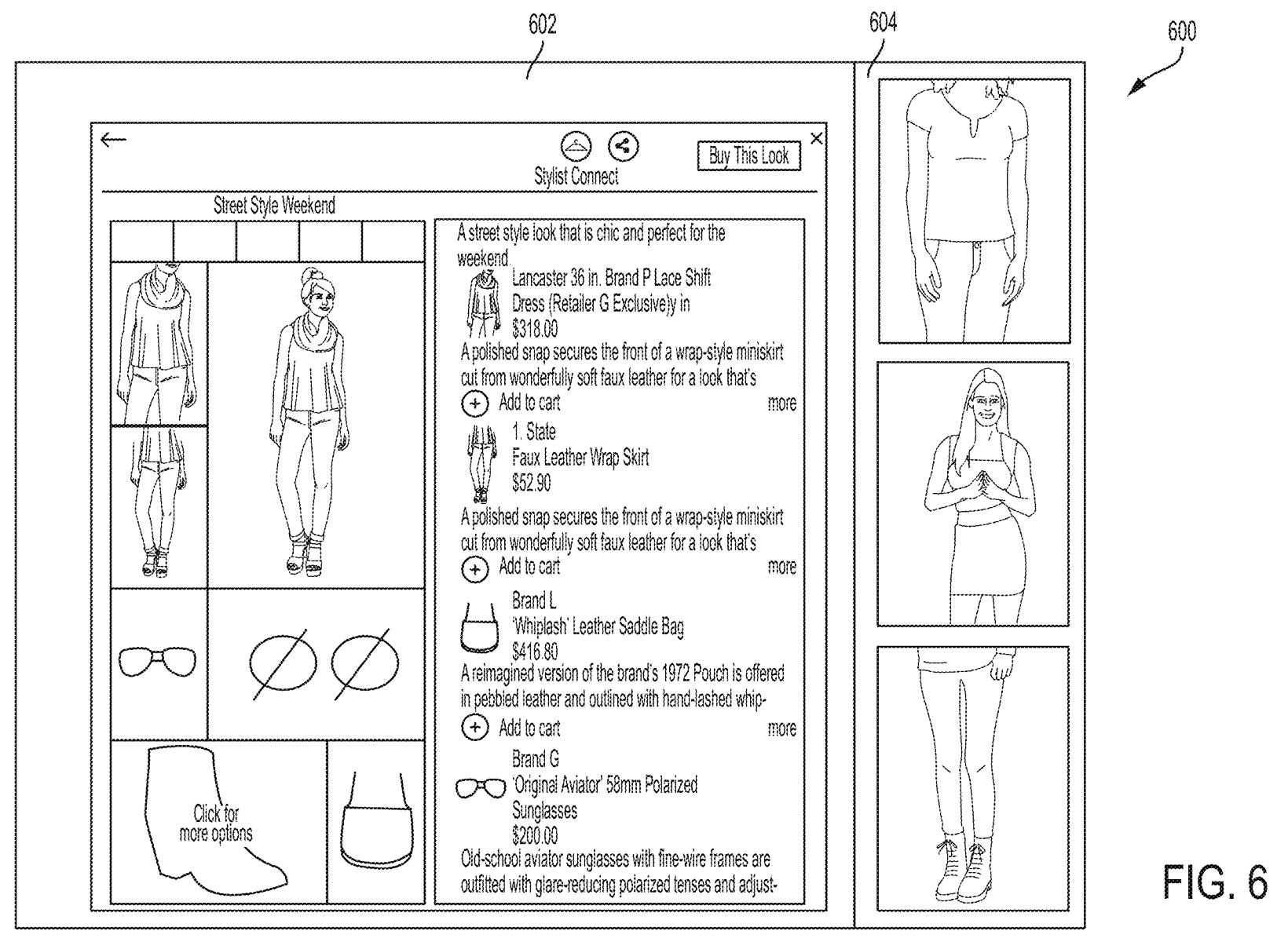

As shown in FIG. 6, users can also manually create styleboards from the available items and images according to an embodiment of the present invention. In an embodiment, the user interface 600 shown in FIG. 6 is generated and updated based on user input by content creation engine 112 of FIG. 1. Users such as retailer merchandisers, stylists, and fashion bloggers can create styleboards to promote specific products, trends, brands, occasions, styles and/or colors. As shown in the window 602 in FIG. 6, an image of a model is shown along with an offer to purchase components of the outfit and accessories worn by the model. Also shown in FIG. 6 is a scrolling window 604 where a user can scroll through various outfits to select one to generate a styleboard about. The ability to manually create styleboards allows the user to create content for strategic partnerships, trends, and promotions. In addition, featured designers and/or bloggers can also be highlighted. Further, the content of the manually created styleboards can be surfaced in recommendation bands, in website landing pages, in social media, and targeted electronic mail (e-mail) campaigns.

Figure 7:
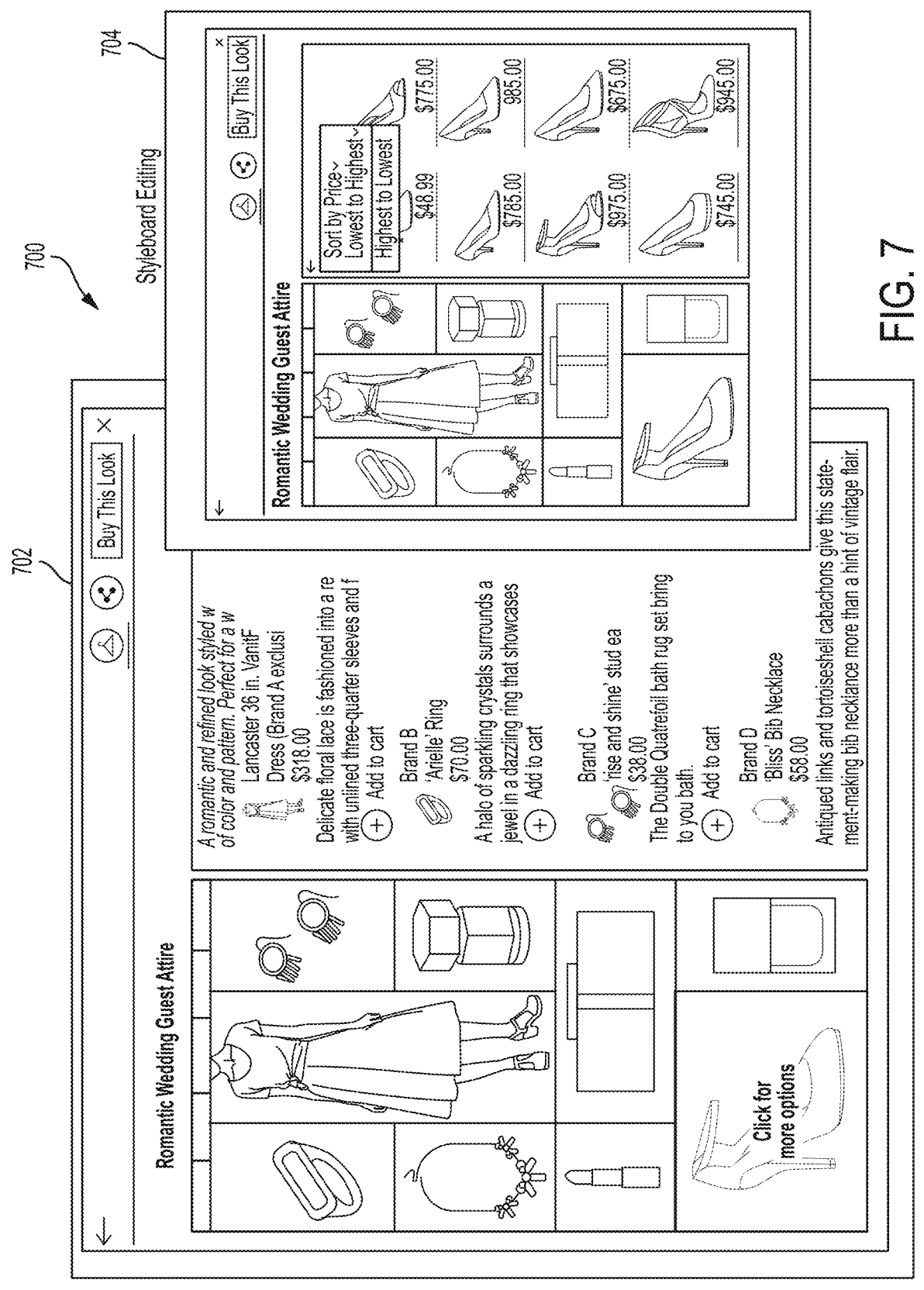

Turning now to FIG. 7, a user interface 700 for editing a styleboard is generally shown in accordance with an embodiment of the present invention. In an embodiment, the user interface 700 shown in FIG. 7 is generated and updated based on user input by content creation engine 112 of FIG. 1. In an embodiment, the styleboard shown in window 702 is presented to a user, such as a customer. The styleboard can be sent to the customer as part of a digital "trunk" or "designer box." As shown in FIG. 7, the customer can use window 704 to customize the styleboard and purchase all or a subset of the products in their customized styleboard. The average order value (AOV) can be increased by inspiring customers to purchase items to complete the look. In an embodiment, the customer can receive a reward, such as a discount or reward points, when they purchase the entire look. A styleboard such as that shown in window 702 can be sent to potential customers via e-mail, a recommendation band, and/or as part of a list of recommendations from another party such as a stylist or designer or blogger. Particular styleboards can be sent to particular potential customers based on criteria such as, but not limited to: past purchasing habits, expressed interest in a particular brand or designer; and retailer promotions. In addition, new products, brands, and trends can be tested by circulating styleboards to potential customers. Though not shown, the user interface 700 can also have a chat portion allowing the user to communicate online and share the styleboard 702 online with an in-store stylist or other person to discuss contents of the styleboard.

Figure 8:
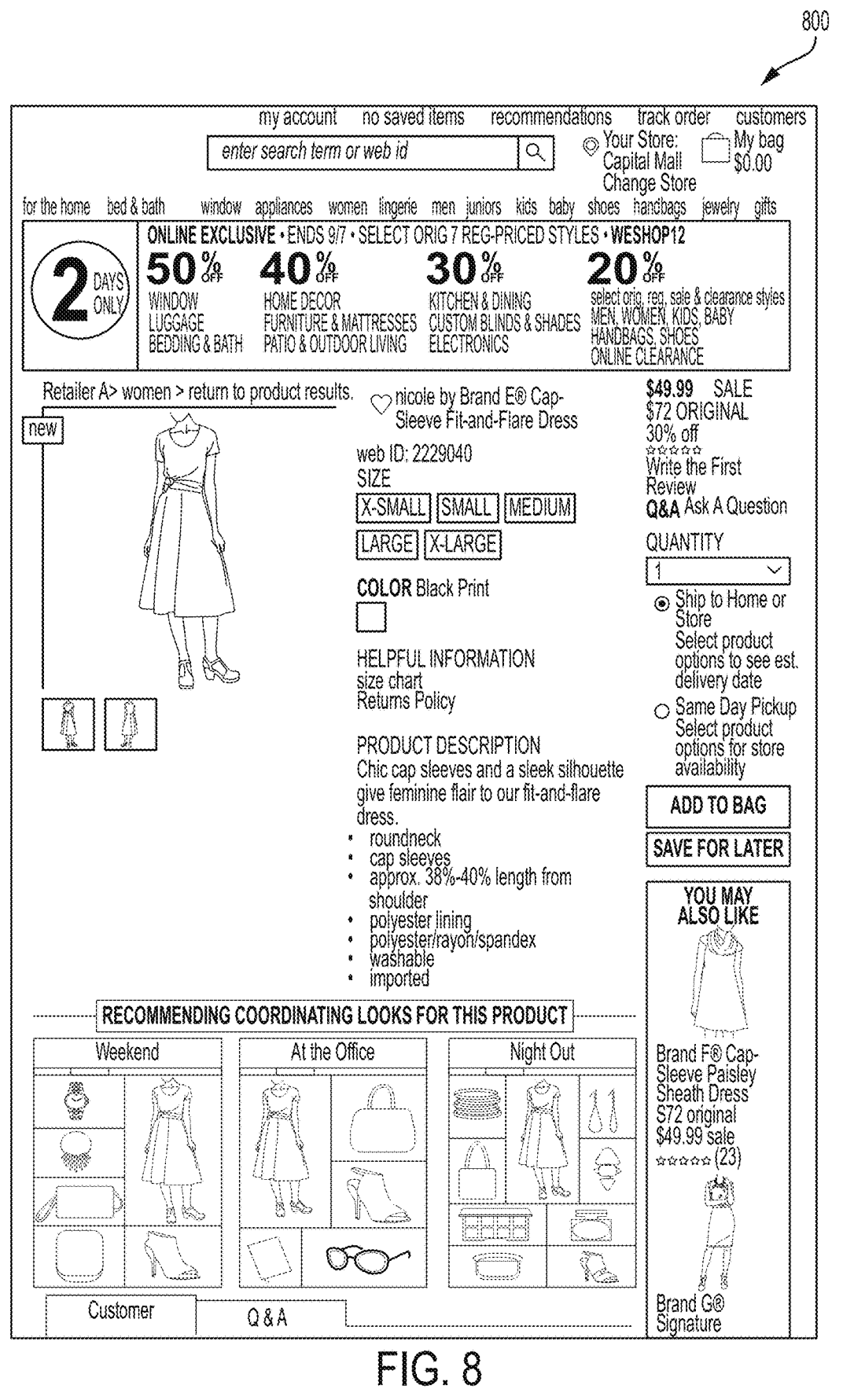

Turning now to FIG. 8, a user interface 800 for displaying a styleboard to a customer in an on-line shopping application is generally shown in accordance with an embodiment of the present invention. In an embodiment, the user interface 800 shown in FIG. 8 is generated and updated based on user input by content creation engine 112 of FIG. 1. The user interface 800 shown in FIG. 8 includes a recommendation band to show customers how to complete a look for any product of interest. The recommendation band can promote particular brands and trends, and inspire the customer with content that they want to share socially. In addition, by presenting the customer with recommended items, more items can be added to the cart resulting in an increased AOV.

Figure 9:
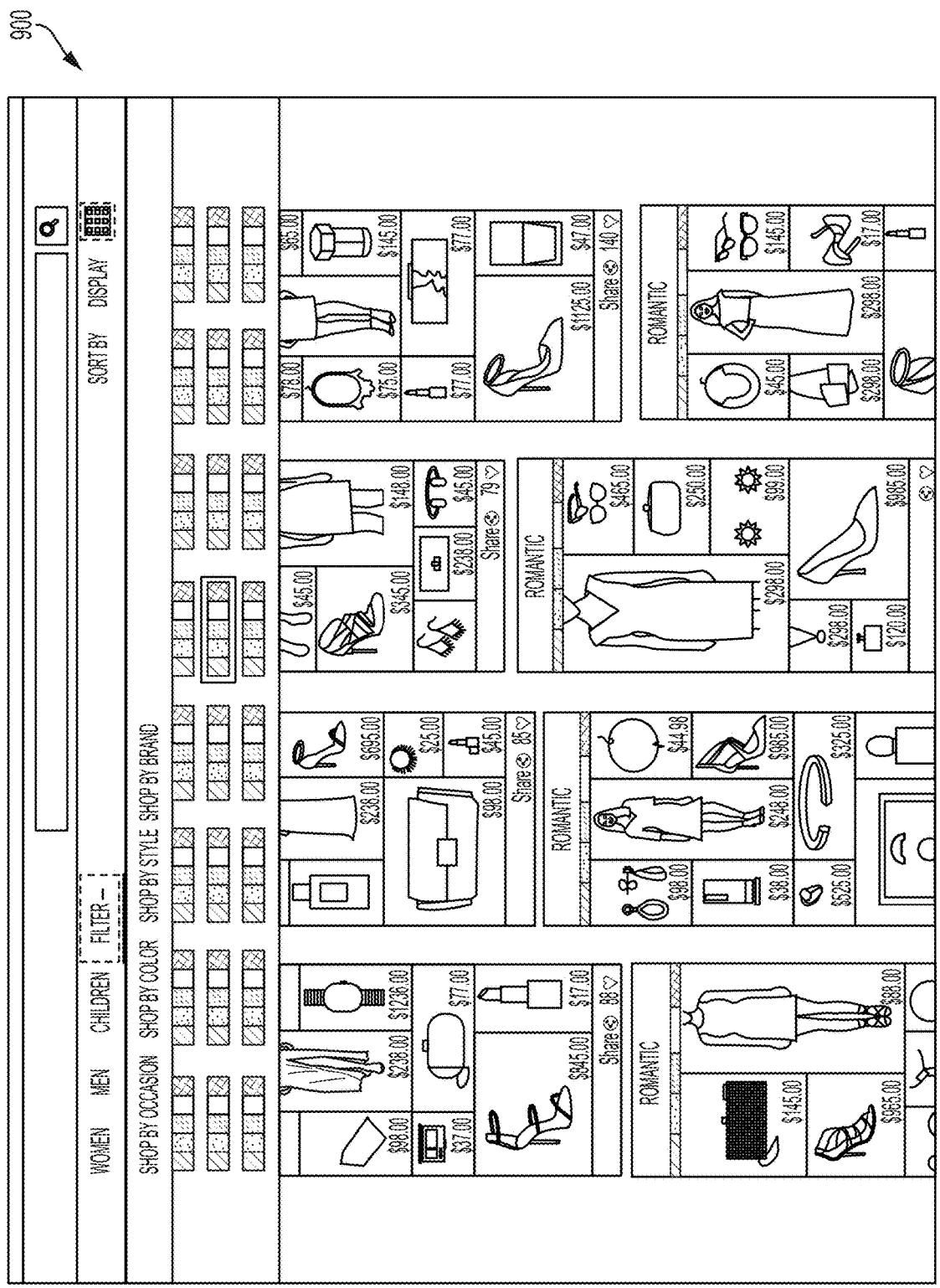
FIG. 9 depicts a user interface for displaying a styleboard to a customer according to an embodiment of the present invention.

Turning now to FIG. 9, a user interface 900 for displaying a styleboard to a customer is generally shown generally shown in accordance with an embodiment of the present invention. In an embodiment, the user interface 900 shown in FIG. 9 is generated and updated based on user input by content creation engine 112 of FIG. 1. As shown in FIG. 9, a dialog flow is added on the front-end that has customers chose the occasion(s) (or room(s)), style(s), and color(s) that they are interested. The customer is instantly presented with styleboards having looks that match the customer's preferences and that can be customized, purchased, and shared on social networks. This experience, similar to having a personal style assistant, can be provided to a customer via an online website, in a store, and/or via a mobile device.

Figure 10:
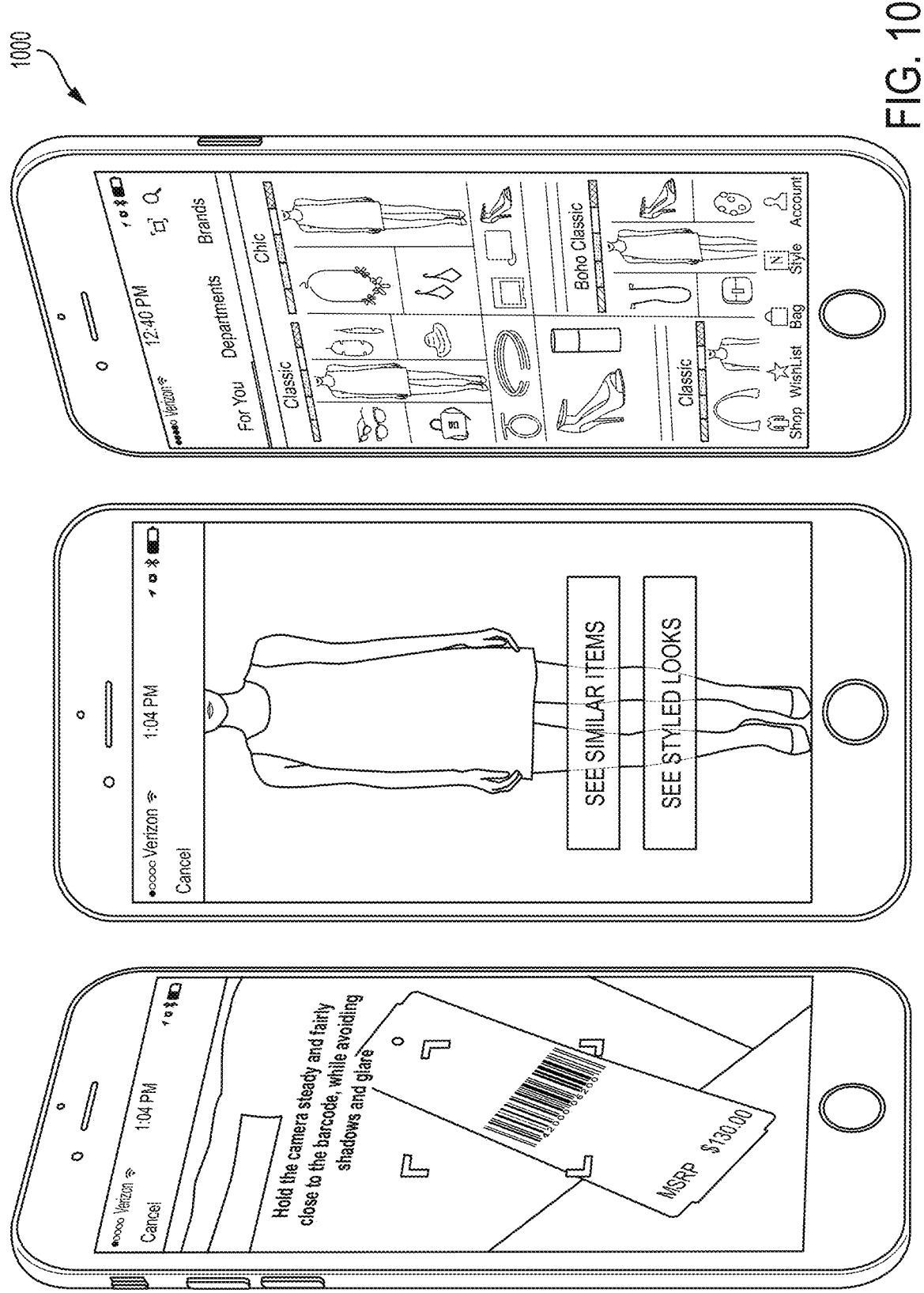
FIG. 10 depicts the use of a barcode scanner to initiate the creation of a styleboard according to an embodiment of the present invention.

Turning now to FIG. 10, the use of a barcode scanner to initiate the creation of a styleboard 1000 is generally shown in accordance with an embodiment of the present invention. As shown in FIG. 10, a user can scan a barcode of a product (or "item"), or product label to retrieve a photograph of the product. The photograph can be uploaded to the system to generate similar products and styleboards for the product to display to user. Similarly, a user can take or select a photograph and upload it to the system to generate similar products and styleboards that coordinate with the uploaded photo. As shown in the embodiment of FIG. 10, the display is on a user device. The processing shown in FIG. 10 can be performed while the user is browsing for items in an on-line or physical retail location.

Figure 11:
FIG. 11 depicts a user interface for displaying an image and attributes of a home décor item according to an embodiment of the present invention.

Turning now to FIG. 11, a user interface 1100 for displaying an image and attributes of a home décor item is generally shown in accordance with an embodiment of the present invention.

Figure 12:
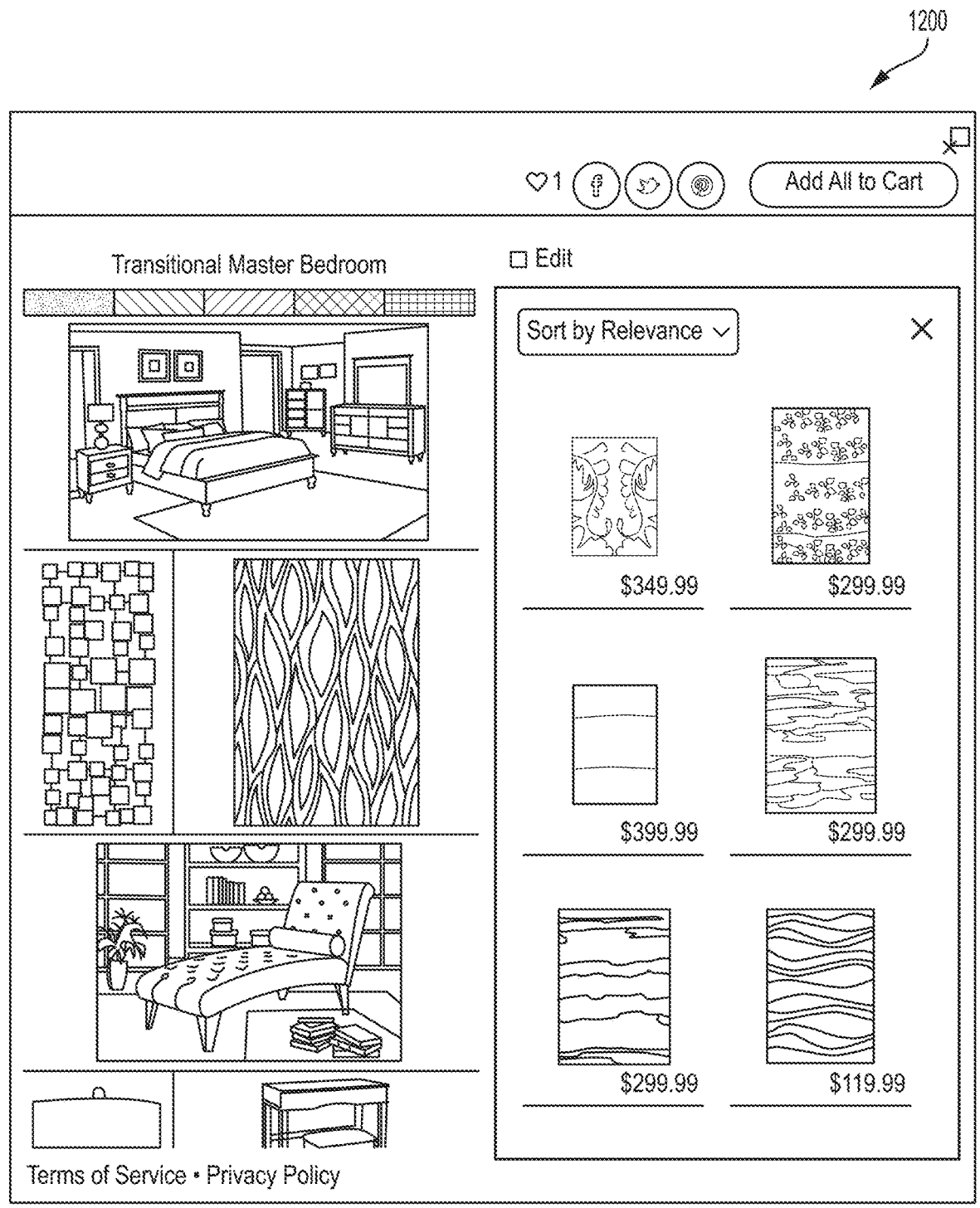
FIG. 12 depicts a user interface for displaying a styleboard that includes coordinated home décor items according to an embodiment of the present invention.

Turning now to FIG. 12, a user interface 1200 for displaying a styleboard that includes coordinated home décor items is generally shown in accordance with an embodiment of the present invention.

Technical effects include executing data attribution of items and contextual content creation of groupings of coordinating items that can be viewed, edited, purchased and shared via various media outlets, such as social media and email. The data attribution programmatically extracts and normalizes item data across a single compartmentalized data set and/or across multiple compartmentalized data sets, such as product catalogs. The attributes may be surfaced in a user interface that enables a user to review and manually adjust attribution.

Set forth below are some embodiments of methods for data attribution of items and contextual content creation of coordinating groups for the items.

Embodiment 1

A non-limiting example method includes receiving data in an electronic format that describes an item, and assigning a unique identifier to the item. The data is normalized across one or more data sets of data that describe other items. The normalizing includes programmatically deriving functional and aesthetic attributes of the item based at least in part on the data that describes the item, where at least one of the derived attributes is not included in the data. The normalizing also includes programmatically mapping the attributes to a defined set of taxonomies for pre-defined attribute types. At least one other item is located in the one or more data sets having attributes that coordinate with the attributes of the item. The locating includes, for each of the pre-defined attribute types, comparing attributes of the item mapped to a pre-defined attribute type with attributes of the at least one other item mapped to the pre-defined attribute type. A user interface that includes a styleboard is generated. The styleboard includes an image of the item and an image of the at least one other item having attributes that coordinate with attributes of the item.

Embodiment 2

The method of claim 1, wherein the styleboard further includes one or both of the attributes of the item and the attributes of the at least on other item.

Embodiment 3

The method of any of Embodiments 1-2, further including selecting a subset of the attributes of the item that are most relevant to describe the item from an aesthetic and functional perspective for the comparing.

Embodiment 4

The method of any of Embodiments 1-3, wherein the predefined attribute types include one or more of color, color group, style, product type, product context, finish, materials, pattern, collection, brand, vendor, price ranking, and specifications.

Embodiment 5

The method of any of Embodiments 1-4, wherein the aesthetic attributes include one or more of color, color group, style, finish, materials, pattern and collection.

Embodiment 6

The method of any of Embodiments 1-5, wherein the functional attributes include one or more of product type, product context and specifications.

Embodiment 7

The method of any of Embodiments 1-6, wherein the one or more items includes a plurality of items.

Embodiment 8

The method of any of Embodiments 1-7, further including modifying the styleboard based at least in part on input from a user.

Embodiment 9

The method of any of Embodiments 1-8, further including modifying the styleboard based at least in part on detecting a change to the data that describes the item.

Embodiment 10

The method of any of Embodiments 1-9, further including modifying the derived attributes based at least in part on input from a user.

Embodiment 11

The method of any of Embodiments 1-10, further including modifying the derived attributes based at least in part on detecting a change to the data that describes the item.

Embodiment 12

The method of any of Embodiments 1-11, further including modifying the mapping based at least in part on input from a user.

Embodiment 13

The method of any of Embodiments 1-12, wherein the data is the image of the item.

Embodiment 14

The method of any of Embodiments 1-13, wherein the item is an item of clothing and the at least one other item comprises other items of clothing and accessories.

Embodiment 15

The method of any of Embodiments 1-14, wherein the item is a home décor item and the at least one other item comprises other household items.

Embodiment 16

A system for data attribution of items and contextual content creation of coordinating groups for the items. The system includes a memory having computer readable instructions; and one or more processors for executing the computer readable instructions, the computer readable instructions controlling the one or more processors to perform any of Embodiments 1-15.

Embodiment 17

A computer program product for data attribution of items and contextual content creation of coordinating groups for the items. The computer program product comprises a storage medium having program instructions embodied therewith, the program instructions executable by a processor to cause the process to implement any of Embodiments 1-15.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method comprising:
   receiving data that describes an item, the data in an electronic format;
   assigning a unique identifier to the item;
   normalizing the data across one or more data sets of data that describe other items, at least one of the one or more data sets in a different electronic format than the received data, the normalizing comprising:
      programmatically deriving functional and aesthetic attributes of the item based at least in part on the data that describes the item, at least one of the derived attributes not included in the data;
      programmatically mapping the attributes to a defined set of taxonomies for pre-defined attribute types; and
      populating data structures corresponding to the pre-defined attribute types with the unique identifier of the item, the populating performed for each of the attributes mapped to the pre-defined attribute types, each of the data structures corresponding to an attribute of the corresponding pre-defined attribute type;
   locating at least one other item in the one or more data sets having attributes that coordinate with or are similar to the attributes of the item, the locating comprising comparing attributes of the populated data structures with attributes of other populated data structures corresponding to the pre-defined attribute types and populated with unique identifiers of other items including the at least one other item; and
   generating a user interface that comprises a styleboard, the styleboard comprising an image of the item and an image of the at least one other item having attributes that coordinate with or are similar to attributes of the item,
   wherein the styleboard is programmatically updated in response to detecting a change to the data that describes the item.

2. The method of claim 1, wherein the styleboard further comprises one or both of the attributes of the item and the attributes of the at least one other item.

3. The method of claim 1, further comprising selecting a subset of the attributes of the item that are most relevant to describe the item from an aesthetic and functional perspective for the comparing.

4. The method of claim 1, wherein the predefined attribute types include one or more of color, color group, style, product type, product context, finish, materials, pattern, collection, brand, vendor, price ranking, and specifications.

5. The method of claim 1, wherein the aesthetic attributes include one or more of color, color group, style, finish, materials, pattern and collection.

6. The method of claim 1, wherein the functional attributes include one or more of product type, product context and specifications.

7. The method of claim 1, wherein the at least one other item includes a plurality of items.

8. The method of claim 1, further comprising modifying the styleboard based at least in part on input via the user interface from one of the multiple users via a user device that is remote from the storage device and updating contents of the one or more datasets based on the input.

9. The method of claim 1, further comprising modifying the derived attributes based at least in part on input from a user.

10. The method of claim 1, further comprising modifying the derived attributes based at least in part on detecting a change to the data that describes the item.

11. The method of claim 1, further comprising modifying the mapping based at least in part on input from a user.

12. The method of claim 1, wherein the data is the image of the item.

13. The method of claim 1, wherein the item is an item of clothing and the at least one other item comprises other items of clothing and accessories.

14. The method of claim 1, wherein the item is a home décor item and the at least one other item comprises other home décor items.

15. The method of claim 1, wherein the styleboard is programmatically updated in response to one or more of the item and the at least one other item being out of stock or discontinued.

16. A system comprising:
   a memory having computer readable instructions; and
   one or more processors for executing the computer readable instructions, the computer readable instructions controlling the one or more processors to perform operations comprising:
   receiving data that describes an item, the data in an electronic format;
   assigning a unique identifier to the item;
   normalizing the data across one or more data sets of data that describe other items, at least one of the one or more data sets in a different electronic format than the received data, the normalizing comprising:
      programmatically deriving functional and aesthetic attributes of the item based at least in part on the data that describes the item, at least one of the derived attributes not included in the data;
      programmatically mapping the attributes to a defined set of taxonomies for pre-defined attribute types; and populating data structures corresponding to the pre-defined attribute types with the unique identifier of the item, the populating performed for each of the attributes mapped to the pre-defined attribute types, each of the data structures corresponding to an attribute of the corresponding pre-defined attribute type;

locating at least one other item in the one or more data sets having attributes that coordinate with or are similar to the attributes of the item, the locating comprising comparing attributes of the populated data structures with attributes of other populated data structures corresponding to the pre-defined attribute types and populated with unique identifiers of other items including the at least one other item; and generating a user interface that comprises a styleboard, the styleboard comprising an image of the item and an image of the at least one other item having attributes that coordinate with or are similar to attributes of the item, wherein the styleboard is programmatically updated in response to detecting a change to the data that describes the item.

17. The system of claim 16, wherein the styleboard further comprises one or both of the attributes of the item and the attributes of the at least on other item.

18. The system of claim 16, wherein the operations further comprise modifying the styleboard based at least in part on one or both of input from a user and the item or the at least one other item being out of stock or discontinued.

19. The system of claim 16, wherein the operations further comprise modifying the derived attributes based at least in part on one or both of input from a user and detecting a change to the data that describes the item.

20. A computer program product comprising a non-transitory computer readable storage medium having program instructions embodied therewith, the program instructions executable by a processor to cause the processor to perform operations comprising:

receiving data that describes an item, the data in an electronic format;

assigning a unique identifier to the item;

normalizing the data across one or more data sets of data that describe other items, at least one of the one or more data sets in a different electronic format than the received data, the normalizing comprising:

programmatically deriving functional and aesthetic attributes of the item based at least in part on the data that describes the item, at least one of the derived attributes not included in the data;

programmatically mapping the attributes to a defined set of taxonomies for pre-defined attribute types; and populating data structures corresponding to the pre-defined attribute types with the unique identifier of the item, the populating performed for each of the attributes mapped to the pre-defined attribute types, each of the data structures corresponding to an attribute of the corresponding pre-defined attribute type;

locating at least one other item in the one or more data sets having attributes that coordinate with or are similar to the attributes of the item, the locating comprising comparing attributes of the populated data structures with attributes of other populated data structures corresponding to the pre-defined attribute types and populated with unique identifiers of other items including the at least one other item; and generating a user interface that comprises a styleboard, the styleboard comprising an image of the item and an image of the at least one other item having attributes that coordinate with or are similar to attributes of the item, wherein the styleboard is programmatically updated in response to detecting a change to the data that describes the item.

* * * * *